United States Patent [19]
Woelffer

[11] 3,863,291
[45] Feb. 4, 1975

[54] CONVERTIBLE ROTARY LAWN MOWER AND AIR BLOWER

[75] Inventor: Neill C. Woelffer, Racine, Wis.

[73] Assignee: Jacobsen Manufacturing Company, Racine, Wis.

[22] Filed: Nov. 26, 1973

[21] Appl. No.: 418,833

[52] U.S. Cl. .................. 15/328, 15/405, 37/43 R
[51] Int. Cl. ............................................. A471 5/02
[58] Field of Search ............ 15/328, 330, 340, 405; 56/2; 37/43 R, 43 L

[56] References Cited
UNITED STATES PATENTS

| | | | |
|---|---|---|---|
| 2,930,068 | 3/1960 | Evanson | 15/328 |
| 2,983,057 | 5/1961 | Erickson | 15/328 |
| 2,991,567 | 7/1961 | Erickson | 15/328 |
| 3,142,913 | 8/1964 | Jacob | 15/328 |
| 3,373,514 | 3/1968 | Forren | 15/328 |

Primary Examiner—Robert W. Jenkins
Attorney, Agent, or Firm—Arthur J. Hansmann

[57] ABSTRACT

A convertible rotary lawn mower and air blower including a mower housing having wheels for movably supporting the housing on the ground and having an engine supported on the housing. The housing has an outer depending skirt, and it has a circular wall spaced radially inwardly from the skirt, such that the skirt and the wall define an air channel in the housing. Air inlet openings are in the housing and permit air to flow from above the housing and into the air channel, and an air-fanning blade in the channel moves the air around the channel and out an air outlet opening in the housing. A cover is removably positioned below the housing to be air tight therewith at the lower edge of the skirt for confining the flow of air around the channel and defining the bottom of the air channel and thus converting the mower to an air blower, and an air chute is attachable to the housing at the air outlet opening for directing the outlet of the air.

5 Claims, 6 Drawing Figures

PATENTED FEB 4 1975

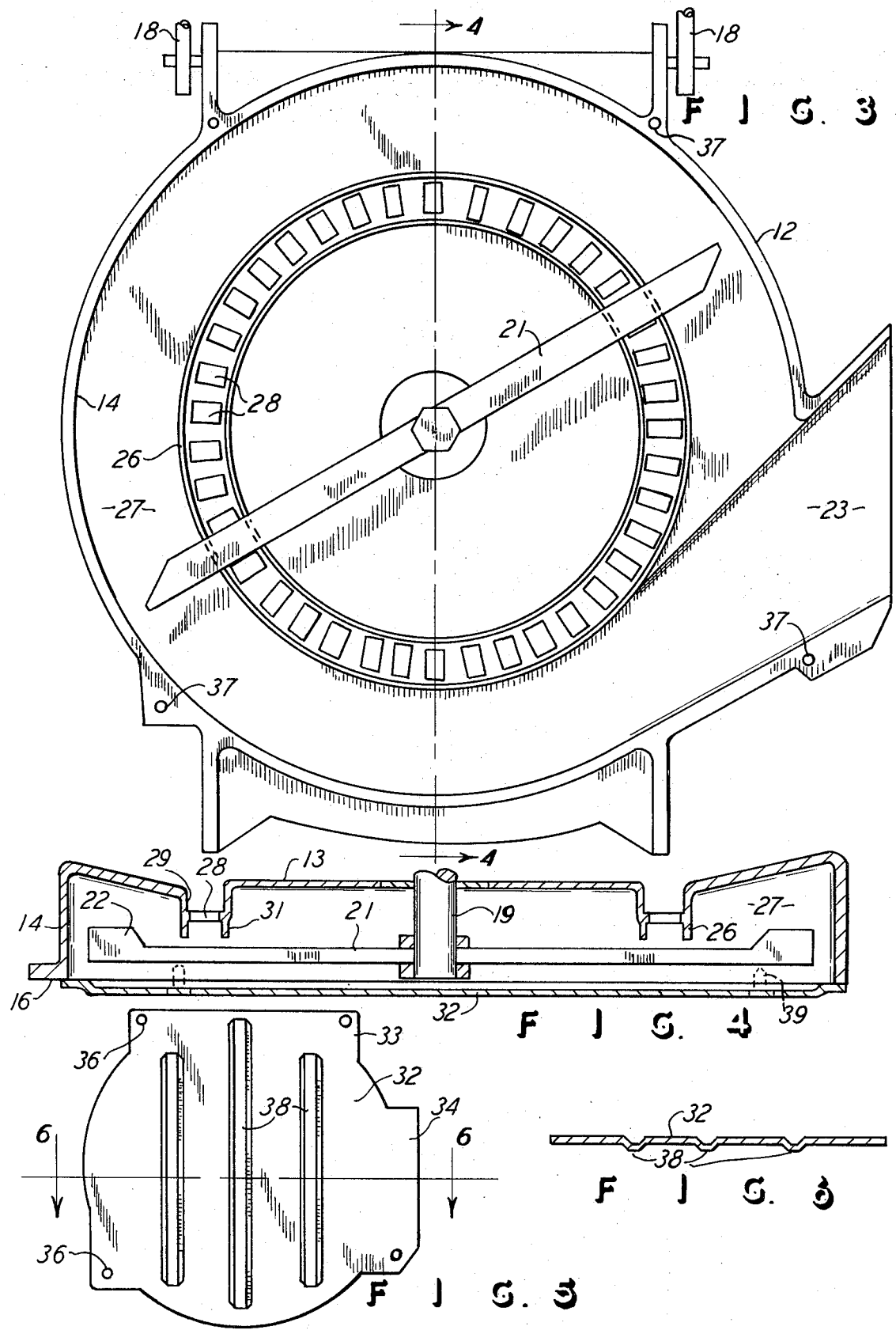

CONVERTIBLE ROTARY LAWN MOWER AND AIR BLOWER

This invention relates to a convertible rotary lawn mower and air blower. More particularly, it pertains to a machine which can be used as either a rotary lawn mower or an air blower, by virtue of a simple conversion from one to the other, and, in both instances, the desired and full quantity of air is moved through the machine for the respective functional purposes of either mowing or air blowing.

BACKGROUND OF THE INVENTION

Rotary lawn mowers are now well established in the lawn mowing art, and these mowers have different forms of air channels within the housing, and they also have different arrangements for introducing air into the housing and for confining the air in its movement through the housing and for directing the air from the housing. For instance, rotary lawn mowers of the present-day popular construction include a mower housing which confines air in a circular path in the housing and which then exhausts the air from the housing and into a grass catcher bag into which the air stream conveys the grass clippings and the air is then evacuated from the bag by passing therethrough. In these prior art arrangements, the air entering the housing is commonly brought into the housing from underneath the housing itself, and this is usually under the depending skirt portion of the housing. In this arrangement, depending upon the elevation of the housing relative to the ground, and depending upon the density of the grass being mowed, the air may be restricted in its flow into the mower housing, and, if so, then inadequate air supply is introduced into the housing and the mower does not function properly. Of even more concern is the fact that the movement of air from the conventional rotary type mower is not a sufficient quantity of air to cause the mower to serve as an air blower, such as an air blower which can positively and firmly displace leaves, cut grass, and other debris lying on the lawn. In fact, under certain circumstances it is desirable to have a conventional type of rotary mower exhaust the air therefrom with only a minimum of force in the exhausting air stream so that when the mower is being used in its mowing function it will not blow the debris to locations where it is not desired.

Of more specific concern with respect to the prior art is the fact that the conventional rotary mowers are not sufficiently useful in serving as an air blower for blowing debris or for like air blower purposes. Accordingly, it is a primary object of this invention to provide a convertible rotary mower and air blower wherein only one machine is provided but the machine serves either function, depending upon the addition of a single cover plate to the bottom of the housing of the machine so that the machine can then serve as an air blower, and the cover plate can be readily removed and the machine can then serve as a lawn mower. In both applications, the machine is arranged so that adequate supply of air enters the housing and is available for the purpose of either supporting the clippings in the air stream and ejecting them from the housing or for creating the forceful air stream for the purposes of utilizing the machine as an air blower.

A further object of this invention is to provide a reliable, simplified, and efficiently operating machine which can serve the purpose of either a rotary lawn mower or an air blower, depending upon the conversion mode of the machine.

Still another object of this invention is to provide a convertible rotary lawn mower and air blower wherein the mower housing is movably supported on the ground and guided by means of a handle for directing the housing and wherein the air outlet of the mower has a chute attached thereto and extending to the forward direction of the mower for guiding the discharge from the mower to serve as an air blower. As such, the rotary mower is convertible into an air blower having sufficient air stream force and velocity for blowing leaves and other debris into a windrow or out from under bushes or shrubbery or the like.

Other objects and advantages will become apparent upon reading the following description in light of the accompanying drawings:

BRIEF DESCRIPTION OF THE DRAWINGS

FIG. 3 is a bottom plan view of the machine as shown in FIG. 1.

FIG. 4 is a sectional view taken along the line 4—4 of FIG. 3, with parts added thereto.

FIG. 5 is a bottom plan view of a cover plate shown in FIG. 4 and being on a reduced scale.

FIG. 6 is a sectional view taken along the line 6—6 of FIG. 5.

DETAILED DESCRIPTION OF THE PREFERRED EMBODIMENT

Figure 1:
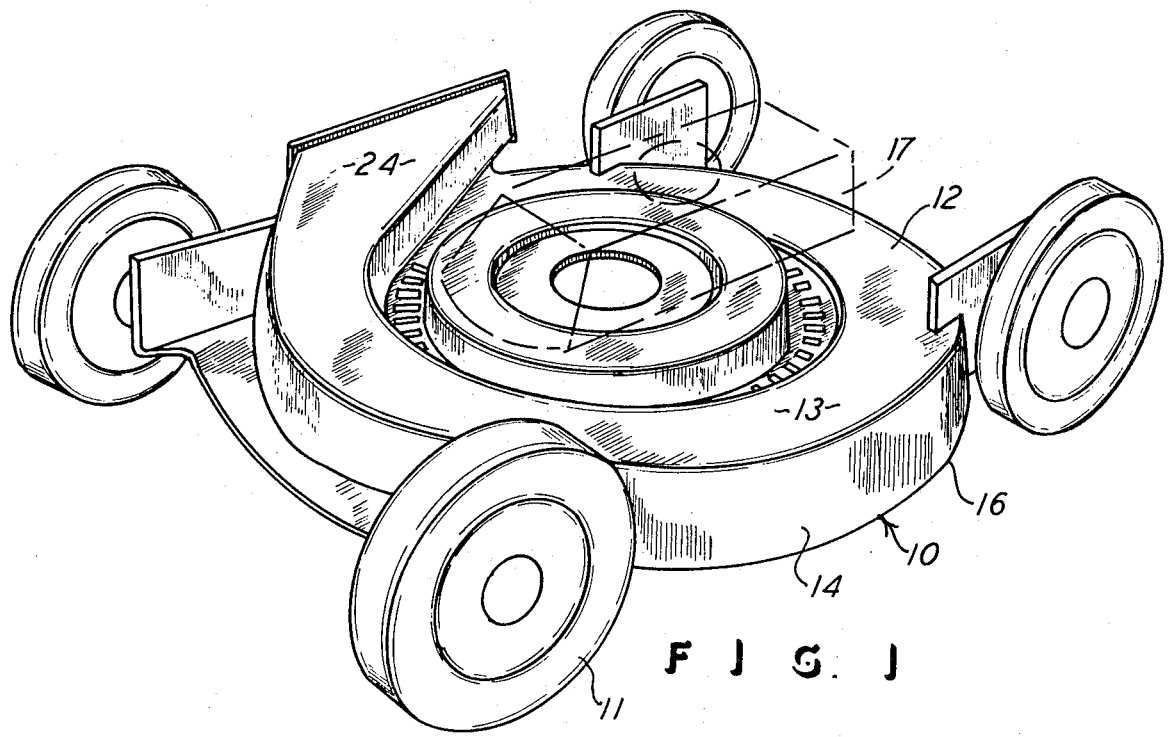
FIG. 1 is a front perspective view of the convertible machine of this invention.

The drawings show a rotary mower and air blower machine generally designated 10 and having ground wheels 11 supporting a housing 12 which has a top deck 13 and a depending skirt 14. The skirt 14 extends to a lower edge 16 which is spaced slightly above the ground and which is on a horizontal plane, as seen in FIG. 4. Also, a prime mover, such as a gasoline engine indicated at 17, is mounted on the housing 12, and the usual handle 18 is attached to the housing 12 for guiding the machine over the ground in the usual manner.

The engine 17 has its shaft 19 extending down into the housing 12, and the shaft 19 carries a blade 21 which is rotatably disposed in the housing 12 as seen in FIGS. 3 and 4. It will further be understood that the blade 21 can be a grass cutting blade, and it can also be an air blowing member having air fanning blades 22 on the opposite ends of the blade 21 for adequate movement of air in the housing 12 upon operation of the engine 17 and rotation of the engine shaft 19. That is, the blade 21 may be either a grass cutting blade or there may be a blade 21 which is an air blowing blade, depending upon the arrangement or desire for the air fanning blades 22, and FIG. 4 shows the member 21 to be an air blowing member having sufficient fanning blades 22.

Figure 2:
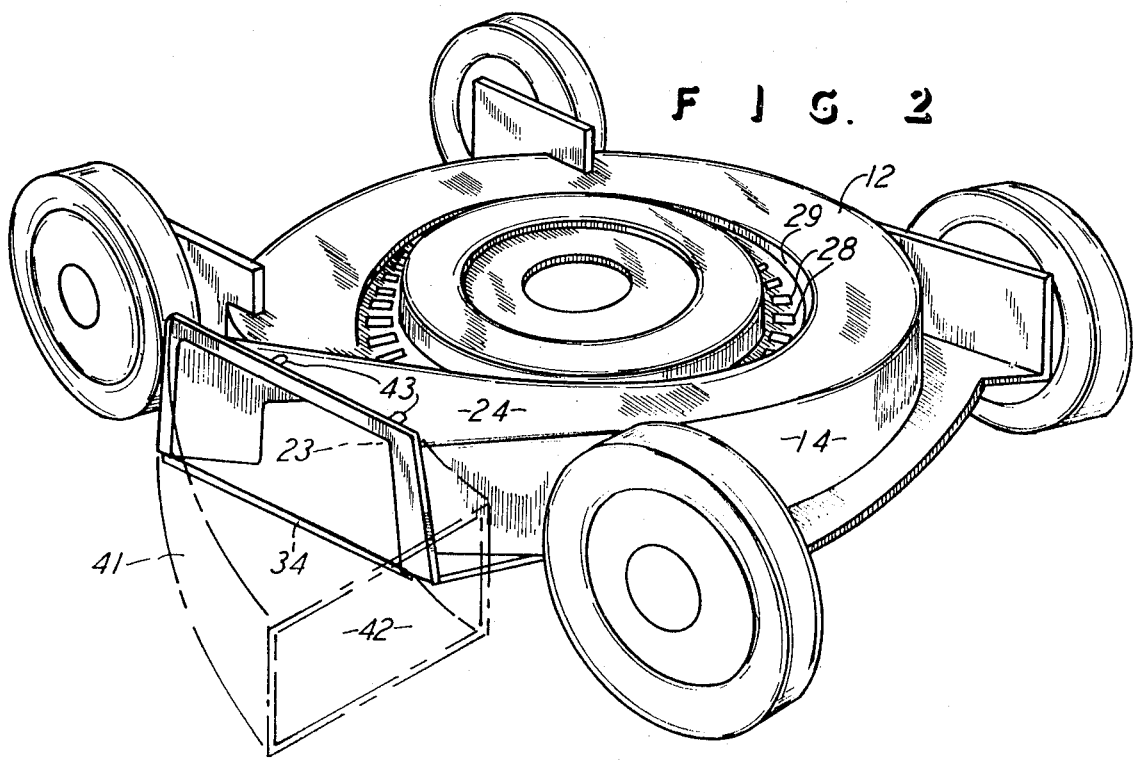
FIG. 2 is a front perspective view of the machine shown in FIG. 1 but taken from the side opposite from FIG. 1 and showing parts added thereto.

The housing 12 has an air outlet opening 23, and this opening is shown to be defined by an air outlet portion 24 of the housing 12 and the portion 24 is the termination of a circularly extending arrangement of the housing 12 with the portion 24 being tangentially extending, as shown in FIGS. 1, 2 and 3. The housing also has a circular wall 26 depending from the top deck 13 and inside the housing 12, and the wall 26 is spaced radially inwardly from the skirt 14 and along with the skirt 14 it defines an air chamber designated 27. Thus the air fanning blade 22 is disposed within the chamber 27 which is a circularly shaped chamber through which the air flows in response to movement of the air blades 22. Also, the housing 12 has air inlet openings or holes 28 in the top deck 13, and these openings are actually located in a depression designated 29 in the top deck 13. The openings 28 are disposed along a circular path which is radially inside the location of the circular wall 26, and another circular wall 31 defines the radially inner limit of the circularly disposed line of holes 28, as seen in FIG. 4.

With the arrangement described, it will therefore be understood that air will enter the housing 12 through the openings 28 and it will flow to the air channel 27 and therearound and out the housing outlet opening 23. Such path of air flow is created when the machine is used as either a lawn mower or an air blower.

When the machine is to be used as an air blower, then a plate member 32 is attached to the housing 12 to extend substantially airtight with the skirt lower edge 16, as shown in FIGS. 2 and 4. The member 32 is thus a cover which encloses the entire bottom area of the housing 12 within the limits of the skirt 14, and the cover 32 thus further defines the air channel 27 by locating the lower limit of the channel 27. The cover 32 is shown in FIG. 5 to be substantially circularly shaped except for extension portions designated 33 and 34, and it will be noted that the portion 34 extends under the mower outlet portion 24, as shown in FIG. 2. As such, the cover 32 forms the enclosed and confined air channel 27 through the extent of the housing outlet portion 24. FIG. 5 further shows that the cover 32 has screw openings 36 which align with threaded holes 37 on the mower housing 12 and therefore permit easy attachment and removal of the cover 32 with respect to the housing 12 for converting the machine from a rotary lawn mower to an air blower. Still further, FIGS. 4, 5 and 6 show that the cover 32 has three ribs 38 which are offset portions relative to the planar disposition of the body of the cover 32, and the ribs 38 extend in the fore-and-aft direction of movement of the machine for sufficient strength of the cover 32 and for serving as runners for engaging the ground, if that condition appears. Thus the cover 32 is substantially a flat circular plate, and screws designated 39 extend through the cover holes 36 and into the housing threaded holes 37 for releasably attaching the cover 32 to the housing 12 and thereby further enclosing the air channel 27 for movement of air through the housing and out the air outlet 23 when the machine serves as an air blower. In this arrangement, the provision of the air inlet openings 28 make it possible for the machine to serve as an air blower for the purposes mentioned at the outset. Also, it is to be noted that the openings 28 are of sufficient number and size so that they provide adequate flow of air into the housing 12, and therefore the openings 28 are shown to extend around the housing 12 in a circular path and to be of a total cross-sectional size at least as great as the cross-sectional area of the annularly-shaped air channel 27 so that ample air can flow into the channel 27 and fill the channel 27 for the air blowing functions being described herein. Therefore, the total area of all the openings 28 is at least one-third of the total area of the circular portion of the housing 12 along which the openings 28 are disposed.

FIG. 2 shows that a chute 41 is removably attached to the housing 12 to form an extension to the housing portion 24 for confining the air flowing from the housing 24 and out the housing outlet 23. The chute 41 has an air outlet opening 42 for directing the air flow forwardly of the machine, in the configuration shown in FIG. 2. That is, the chute 41 is shown to be a right-angle elbow type of chute, and it is removably attached to the housing 12 through any suitable attachment, such as the attaching members designated 43. In actuality, the chute 41 can be attached to the mower housing 12 in the manner in which a lawn mower clipping bag is attached to the housing, such as that shown in U.S. Pat. No. 3,721,078. Of course the machine when converted to the air blower arrangement where the air blades 22 and the cover 32 are employed could be used with or without the extension chute, such as the chute 41, or, the chute could be of a straight configuration extending directly in line with the machine outlet 23, rather than being curved as shown by the chute 41.

With the arrangement described, it will therefore be understood that the machine can be used either as a rotary lawn mower without the cover 32, or it can be used as an air blower when the cover 32 is applied as shown. In both instances, an ample supply of air enters the air channel 27 through the openings 28, and thus the machine will serve its function of the rotary lawn mower having an air stream for supporting the cut clippings which move through the outlet 23, and it will also serve as the air blower having ample air entering the housing through the openings 28 and being blasted from the housing through the outlet opening 23 and through any chute that may be attached to the housing 12, as described. In the arrangement described, the cover 32 has the extension 34 which is disposed underneath the housing outlet portion 24 for fully confining the air to the position of the extreme of the outlet opening 23, and the chute 41 is then in full air-flow communication with the outlet 23 for receiving all of the air moving through the outlet 23 and into the chute passageway and outlet 42. That is, the chute 41 receives all of the air moving through the channel 27, by virtue of the extension 34 and by virtue of the chute arrangement with the housing 12, and the chute 41 confines the air for sufficient blasting or stream formation of the air in a horizontally-directed stream from the outlet 42. That is, the chute 41 is horizontally disposed and does not extend upwardly and thus the stream is horizontally directed through the outlet 42.

What is claimed is:

1. A convertible rotary lawn mower and air blower, comprising a rotary lawn mower housing including a top portion and including a skirt portion depending from said top portion and extending along the periphery of said housing and having an air outlet opening therein and terminating in a lower edge extending along a horizontal plane, a circular wall depending from said top portion and spaced radially inwardly from said skirt portion and defining an air channel with said skirt portion, a prime mover mounted on said housing, an air-fanning member supportedly mounted on said prime mover and being rotated thereby and including air-fanning blades disposed in said air channel for movement of air through said air channel and out said air outlet opening upon rotation of said air-fanning member, said housing top portion having air inlet opening therein disposed at locations spaced radially inwardly from said circular wall for the flow of air into said housing and into said air channel and out said air outlet opening, and a cover removably attached to said housing and extending fully across said skirt portion to be air-tight therewith at said lower edge thereof and defining the bottom of said air channel and enclosing the bottom of said housing to confine the flow of air in said air channel and thereby convert the rotary mower into an air blower.

2. The convertible rotary lawn mower and air blower as claimed in claim 1, including an air chute attached to said housing and extending in air-flow communication with said air outlet opening for confining and directing the flow of air from said housing.

3. The convertible rotary lawn mower and air blower as claimed in claim 1, wherein said cover is a sheet piece extending on a flat plane and includes an extension on one edge thereof and disposed underneath said air outlet opening to define the bottom of said air outlet opening.

4. The convertible rotary lawn mower and air blower as claimed in claim 3, wherein said cover is circularly shaped in its edge beyond said extension, said cover including ribs extending therealong underneath the flat plane of said cover and with said ribs being elongated in the fore-and-aft direction of said mower, and the peripheral portion of said cover having openings therein for attachment of said cover to said housing.

5. The convertible rotary lawn mower and air blower as claimed in claim 3, and including an air chute attached to said housing and extending in air-flow communication with said air outlet opening for confining and directing the flow of air from said housing, and including a handle attached to said housing for guiding and directing said housing along the ground and thereby directing the outlet flow of air from said chute and to desired locations on the ground.

* * * * *